(12) United States Patent
Rowley

(10) Patent No.: US 7,744,140 B2
(45) Date of Patent: Jun. 29, 2010

(54) GRIPPING DEVICE

(75) Inventor: James Rowley, Lancaster (GB)

(73) Assignee: BSW Limited, Lancaster (GB)

( * ) Notice: Subject to any disclaimer, the term of this patent is extended or adjusted under 35 U.S.C. 154(b) by 231 days.

(21) Appl. No.: 11/397,128

(22) Filed: Apr. 4, 2006

(65) Prior Publication Data

US 2006/0269360 A1    Nov. 30, 2006

(30) Foreign Application Priority Data

Apr. 6, 2005  (GB) ................... 0506929.9

(51) Int. Cl.
  *B66C 1/56*   (2006.01)
  *E21B 19/00*  (2006.01)
(52) U.S. Cl. .......................... 294/94; 294/96
(58) Field of Classification Search ............ 294/94, 294/67.2, 67.22, 96; 242/571.1; 192/88 B
See application file for complete search history.

(56) References Cited

U.S. PATENT DOCUMENTS

| | | | |
|---|---|---|---|
| 5,967,477 A * | 10/1999 | Walmsley | 248/230.2 |
| 6,202,955 B1 * | 3/2001 | Self | 242/530.3 |
| 6,513,751 B2 * | 2/2003 | Michel | 242/571.1 |
| 7,445,050 B2 * | 11/2008 | Kuttel et al. | 166/380 |
| 7,552,764 B2 * | 6/2009 | Weems et al. | 294/94 |
| 2008/0007056 A1 * | 1/2008 | Beesley | 285/321 |

FOREIGN PATENT DOCUMENTS

| | | |
|---|---|---|
| GB | 2220018 A | 10/1940 |
| GB | 2155577 A | 9/1985 |
| GB | 2335008 A | 9/1999 |
| GB | 2341620 A | 3/2000 |
| WO | WO2004/020781 A | 3/2004 |
| WO | WO2004/055394 | 7/2004 |

* cited by examiner

*Primary Examiner*—Paul T Chin
(74) *Attorney, Agent, or Firm*—Gauthier & Connors LLP

(57) ABSTRACT

A mooring connector or pipeline recovery tool comprising a mandrel (10) around which is concentrically disposed a ball cage (11) having balls (12) protruding therefrom so that relative longitudinal movement of the mandrel (10) and ball cage (11) causes the balls to ascend ramped surfaces of the mandrel (10) thus to protrude outwardly through the ball cage (11). The conventional arrangement of balls in regular rows and columns is replaced by helical rows or random arrays of the balls thus to avoid excessive grooving and deformation of the wall of a receptor into which the connector is inserted.

3 Claims, 2 Drawing Sheets

GRIPPING DEVICE

CROSS REFERENCE TO RELATED APPLICATION

This application claims priority to British application No. 0506929.9 filed on Apr. 6, 2005.

BACKGROUND OF THE INVENTION

This invention concerns a gripping device and particularly, though not exclusively, a device to serve as a pipeline recovery tool or mooring connector.

Devices of this kind are known and described, for example, in patent specification WO 2004/055394 which refers to a mooring connector being a device which is inserted into an anchored receptor, for example on the sea bed, and responds to a pull from a mooring line attached to the connector, by locking together the connector and the receptor.

Alternatively, a pipeline recovery tool may be in the form of a mandrel which is placed inside a pipe and when pulled locks the tool and the pipe together. In some cases, such a tool may be of tubular form to be located around an object to be recovered, again operating such that the tool and the object become interlocked when the tool is pulled.

The device involves so-called ball and taper assemblies, and comprises a pair of elongate members, one of which has an array of ramped surfaces while the other comprises a ball cage with an array of balls interacting with the ramped surfaces such that relative movement of the two elongate members causes the balls to protrude through apertures in the ball cage thus to engage, internally or externally, the pipe or other object to be gripped. In the case of a mooring connector a mooring line is thus connected to a fixed anchor, some means being provided to release the connector from the anchor when required.

In all such devices the ramped surfaces of the mandrel, the apertures of the ball cage, and the balls residing therein, are disposed in longitudinally spaced annular rows around the gripping device. Since the gripping relationship between the device and the object to be gripped involves considerable force, the effect is that the balls tend to become partially embedded within the surface of the object to be gripped with the result that after repeated use of the device, the receptive object displays regular annular grooves created by the rows of balls. It is an object of the present invention to provide a gripping device of this general kind but where such a disadvantage is at least substantially overcome.

SUMMARY OF THE INVENTION

According to the present invention there is provided a gripping device comprising a first elongate member, a plurality of ramped surfaces spaced apart thereon, a second elongate member superimposed with respect to the ramped surfaces of the first elongate member, a plurality of rolling members captively retained within apertures of the second elongate member so as to reside respectively on the ramped surfaces of the first elongate member, and means permitting relative movement of first and second elongate members to cause the rolling members to ascend the ramped surfaces so as to protrude partially through their respective apertures; characterized in that the rolling members and their respective ramped surfaces and apertures are disposed randomly about the device or in longitudinally spaced rows where the rolling members of each row are offset laterally with respect to those of the next succeeding row.

The rolling members may be disposed in helical arrays.

The first elongate member may be a mandrel of circular cross-section having the second elongate member concentrically disposed around it.

The first elongate member may be tubular and of circular cross-section having the second elongate member concentrically disposed within it.

The first and second elongate members may be arranged for longitudinal movement, one with respect to the other.

The second elongate member may be a ball cage having an array of apertures through which the respective balls may protrude.

An embodiment of the invention will now be described, by way of example only, with reference to the accompanying drawings in which:

DETAILED DESCRIPTION

Figure 1:
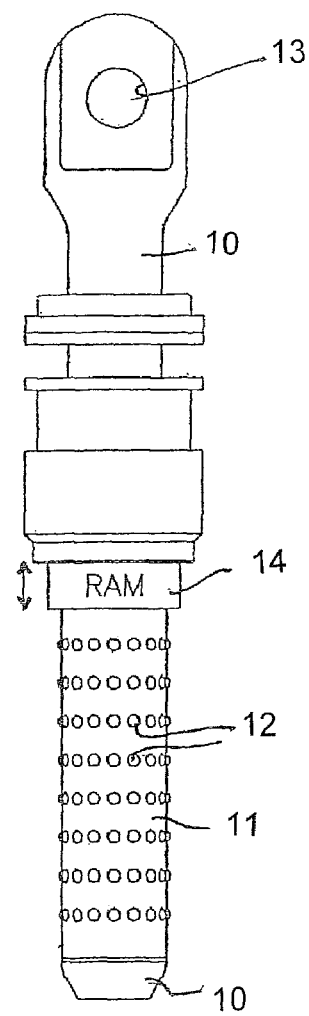
FIG. 1 shows a mooring connector or pipeline recovery tool of a conventional design.

Referring now to the drawings, a mooring connector comprises a mandrel (10) having a ball cage (11) with rows (12) of balls protruding therethrough. At one end of the mandrel (10) is an eye (13) to which may be connected to a mooring line. A hydraulic or other ram mechanism (14) provides limited relative longitudinal movement between the mandrel (10) and the ball cage (11).

Figure 2:
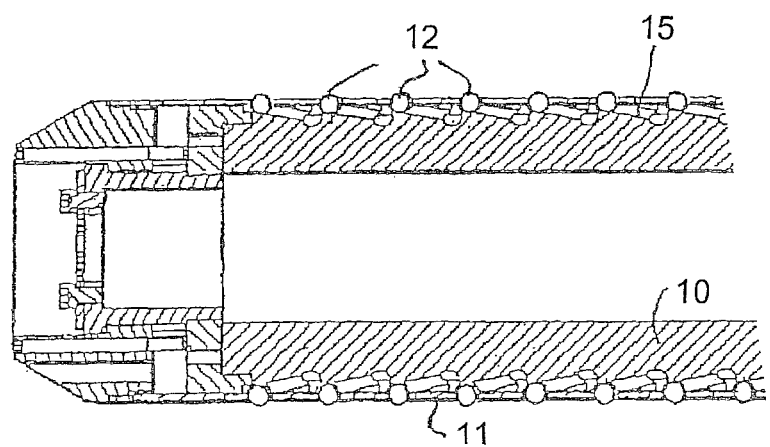
FIG. 2 is a cross-sectional view through one end of the connector of FIG. 1.

Referring now to FIG. 2, it will be seen that the balls (12) are captively retained by the cage (11) each on a ramped surface (15) of the mandrel (10) with the result that relative longitudinal movement of the mandrel and the ball cage causes the balls (12) to ascend their respective ramped surfaces (15) thus to protrude outwardly through the respective apertures in the ball cage (11).

Such a connector is typically inserted into a cylindrical receptor (not shown) whereupon a pull on the mooring line serves to advance the balls (12) through the ball cage (11) to engage an adjacent inner surface of the receptor. The interlocking strength of the two parts is proportional to the force of the pull on the connector. In effect, the balls (12) become partially embedded within the adjacent wall of the receptor to assist in maintaining the interlock.

Figure 3:
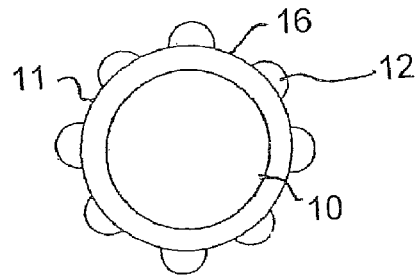
FIG. 3 is a schematic representation of an end view of a tool of the kind shown in FIG. 1.

Referring now to FIG. 3, it will be seen that the longitudinal alignment of the balls of adjacent rows results in longitudinally directed surface areas (16) of the mandrel having no contact with the inner surface of the receptor and so any relative movement of the connector with the receptor will tend to create longitudinal columns and annular rows of grooves in the receptor wall which can lead to distortion of the receptor.

Figure 4:
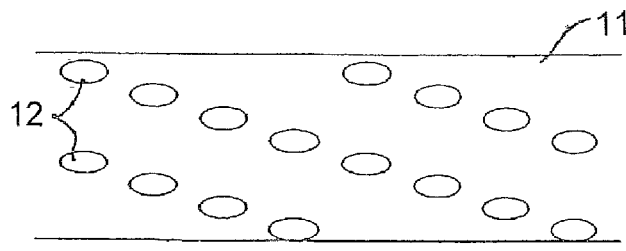
FIG. 4 is a schematic view of a part of such tool modified in accordance with the invention.

Referring now to FIG. 4, and in accordance with the present invention, the balls (12), their respective apertures in the ball cage, and ramped surfaces (15) in the mandrel are arranged in a helical pattern such that the balls of each circumferential row are offset laterally with respect to those of the next succeeding row.

Figure 5:
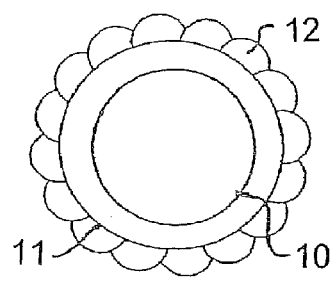
FIG. 5 is a schematic end view of the modified tool represented in FIG. 4

Referring now to FIG. 5, it will be seen that this arrangement leaves no continuous longitudinal spaces between columns of balls as is the case in the conventional arrangement. The effective non-uniform arrangement of the balls therefore results in a more uniform grip upon the adjacent surface of the receptor with the results that excessive grooving or deformation of the latter is substantially avoided.

Within scope of the invention, the balls may be arranged in a completely random fashion provided they achieve the result of avoiding excessive regularity of rows and columns as in the case of the conventional arrangement of FIGS. 1 to 3.

It will be understood that while this invention has been described in relation to an embodiment of a mooring anchor or pipeline recovery tool. Nevertheless, it can be applied also to gripping members adapted to grip an outer surface of an object to be recovered thereby or connected thereto. In such a case, the ball cage will be located within a body having ramped surfaces.

The invention claimed is:

1. A gripping device comprising a first elongate member, a plurality of ramped surfaces spaced apart thereon, a second elongate member superimposed with respect to the ramped surfaces of the first elongate member, wherein the second elongate member is tubular and of circular cross-section having the first elongate member concentrically disposed within it, a plurality of rolling members captively retained within apertures of the second elongate member so as to reside respectively on the ramped surfaces of the first elongate member and means permitting relative movement of the first and second elongate members in a longitudinal direction of the tubular second elongate member to cause the rolling members to ascend the ramped surfaces so to protrude partially through their respective apertures; characterised in that the rolling members and their respective ramped surfaces and apertures are disposed in helical arrays about the device, such that from one end of the second elongate member to an opposite end of the second elongate member, no axially directed continuous spaces remain between the rolling members.

2. A gripping device according to claim 1 wherein the first elongate member is a mandrel.

3. A gripping device comprising a first elongate member, a plurality of ramped surfaces spaced apart thereon, a second elongate member superimposed with respect to the ramped surfaces of the first elongate member, wherein the second elongate member is tubular and of circular cross-section having the first elongate member concentrically disposed within it, a plurality of rolling members captively retained within apertures of the second elongate member so as to reside respectively on the ramped surfaces of the first elongate member and means permitting relative movement of the first and second elongate members in a longitudinal direction of the tubular second elongate member to cause the rolling members to ascend the ramped surfaces so to protrude partially through their respective apertures; characterised in that the rolling members and their respective ramped surfaces and apertures are disposed randomly about the device, except to the extent that from one end of the second elongate member to an opposite end of the second elongate member, no axially directed continuous spaces remain between the rolling members.

* * * * *